3,240,776
N-(2-CHLOROETHYL)AZIRIDINE AND ITS PREPARATION

Gordon R. Miller, Lake Jackson, Tex., assignor to The Dow Chemical Company, Midland, Mich., a corporation of Delaware
No Drawing. Filed Feb. 5, 1965, Ser. No. 430,749
6 Claims. (Cl. 260—239)

This invention relates to the compound N-(2-chloroethyl)aziridine and methods for the production of said compound, hereinafter called CEA.

The preparation of CEA has been reported (Chem. and Ind., 1961, 1911) but the authors later declared their publication to have been erroneous (Chem. and Ind., 1962, 1017).

According to the invention, CEA is conveniently made by the reaction of ethylene chloride or ethylene chlorobromide with aziridine in the presence of a suitable acid acceptor. In this reaction, an excess of ethylene halide should be used to avoid loss of product by reaction of the second halogen atom of the ethylene halide. Suitably at least about 3, and preferably 5 to 10 moles of alkylene halide per mole of aziridine should be used. Even higher ratios can be used but offer no practical advantage.

The acid acceptor should be a base that will largely decompose the hydrohalide salt of the aziridine compounds present in the reaction mixture. Conventional acid acceptors suitable for the purpose include the alkali and alkaline earth metal oxides and hydroxides, the preferred ones being sodium and potassium hydroxides and calcium and barium oxides and hydroxides.

The process of the invention can be carried out over a wide range of temperatures. At ordinary room temperature of about 20° C. the reaction is slow and may require several hours to achieve significant conversion. On the other hand, temperatures in excess of about 120° C. may cause unnecessary losses through polymerization and other side-reactions. In general, the preferred temperature range is about 80–100° C., at which a reaction time of about 1–2 hours is usually satisfactory.

Since the excess ethylene halide serves as a reaction solvent, no other solvent is required or ordinarily used, though an inert diluent can be used if desired. Suitable such solvents include diethyl ether, dioxane, benzene, toluene and hexane.

Because of the high volatility of aziridine, it is usually preferred to conduct the reaction of the invention in a closed vessel, though it can be done, for instance, under reflux at atmospheric pressure or even at a temperature below the boiling point. When a closed reactor is used, the reaction is ordinarily conducted at autogenous pressure, though the reactor may be pressurized with an inert gas, such as nitrogen, if desired.

When the reaction period is over, the CEA can be separated from the reaction mixture by any convenient means, the most convenient being distillation. Because of its sensitivity to heat it is advisable to distill the CEA at low temperature and pressure.

The practice of the invention is illustrated by the following example.

A mixture of 396 g. (4.0 m.) of ethylene chloride, 44.8 g. (0.8 m.) of CaO and 14.9 g. (0.35 m.) of aziridine was placed in an autoclave which was then flushed and pressurized to 600 p.s.i. with nitrogen. It was then heated at 93° C., with agitation, for 1.5 hours, cooled and emptied. The liquid contents were distilled to remove unused reactants after which the product was distilled at 23° (10 mm.).

Analysis of the reaction product showed that 2.55 g. of aziridine was unreacted and the yield of N-(2-chloroethyl)aziridine, based on aziridine consumed, was 83%. The product was identified by elemental analysis and infrared and mass spectra. It was a colorless liquid having $n_D^{20}=1.4518$, $d_4^{20}=1.017$ and the following analysis.

Calcd.: C, 45.4; H, 7.58; N, 13.3; Cl, 33.6. Found: C, 45.9; H, 7.70; N, 13.6; Cl, 33.2.

It readily polymerized on standing at room temperature.

CEA is useful as a chemical intermediate since its molecule contains both a reactive chlorine atom and also the aziridine ring. The latter renders the compound easily polymerizable by the action of heat or acids. The solid polymers thus produced are useful as ion-exchange agents. CEA also reacts with alcohols, phenols and the like to produce the corresponding N-(2-chloroethyl)-2-aminoethyl derivatives.

I claim:
1. N-(2-chloroethyl)aziridine.
2. The process for making N-(2-chloroethyl)aziridine comprising reacting by contacting aziridine with an ethylene halide selected from the group consisting of ethylene chloride and ethylene chlorobromide in the presence of an acid acceptor.
3. The process of claim 1 wherein the ethylene halide is ethylene chloride.
4. The process of claim 3 wherein the acid acceptor is calcium oxide.
5. The process of claim 4 wherein the reaction temperature is 20–120° C.
6. The process of claim 5 wherein the molar ratio of ethylene chloride to aziridine is at least 3:1.

No references cited.

NICHOLAS S. RIZZO, *Primary Examiner.*